United States Patent
Kubota et al.

(10) Patent No.: US 6,657,156 B2
(45) Date of Patent: Dec. 2, 2003

(54) LASER WELDING METHOD AND LASER WELDING APPARATUS

(75) Inventors: Tetsuya Kubota, Kobe (JP); Yoshimitsu Kurosaki, Kakogawa (JP); Eiichi Yagi, Kobe (JP); Tomoyuki Uno, Kobe (JP); Hirotaka Uehara, Ashiya (JP); Osamu Satoh, Akashi (JP); Shigekazu Shikoda, Akashi (JP); Takayuki Murata, Akashi (JP); Mamoru Nishio, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/020,193

(22) Filed: Dec. 18, 2001

(65) Prior Publication Data

US 2002/0084260 A1 Jul. 4, 2002

(30) Foreign Application Priority Data

Dec. 28, 2000  (JP) ......................................... 2000-400151

(51) Int. Cl.[7] .............................................. B23K 26/00
(52) U.S. Cl. .............................. 219/121.63; 219/121.78
(58) Field of Search ....................... 219/121.63, 121.64, 219/121.78, 121.79, 121.8, 121.81

(56) References Cited

U.S. PATENT DOCUMENTS

| 4,649,256 A | * | 3/1987 | Minamida et al. | .... 219/121 LD |
| 5,714,762 A | * | 2/1998 | Li et al. | .................. 250/559.2 |
| 5,715,375 A | * | 2/1998 | Ito et al. | ........................ 395/93 |
| 6,369,356 B1 | * | 4/2002 | Beck et al. | ............ 219/121.83 |

FOREIGN PATENT DOCUMENTS

| JP | A 55-1959 | 1/1980 |
| JP | A 61-17364 | 1/1986 |
| JP | A 63-84851 | 4/1988 |
| JP | A 1-99104 | 4/1989 |
| JP | A 3-81079 | 4/1991 |
| JP | A 4-246660 | 9/1992 |
| JP | A 6-246660 | 9/1994 |
| JP | A 11-33753 | 2/1999 |
| JP | A 2000-237887 | 9/2000 |

* cited by examiner

Primary Examiner—M. Alexandra Elve
(74) Attorney, Agent, or Firm—Oliff & Berridge, PLC

(57) ABSTRACT

A weld portion detector (20) and a laser beam projector (10) disposed a predetermined distance behind the weld portion detector (20) are moved together. The weld portion detector (20) detects a weld line and the laser beam projector (10) projects on the weld line detected by the weld portion detector (20) for laser welding. Pieces of data on weld positions sequentially detected by the weld portion detector (20) are stored sequentially in combination with times when the pieces of data on the weld positions are obtained and moving speeds of the weld portion detector (20) in a memory. A time when the weld portion detector (20) passed a point at which the laser beam projector (10) has just arrived is calculated on the basis of the times and the moving speeds stored in the memory. The laser beam projector (10) projects a laser beam on a weld position detected at the thus calculated time.

10 Claims, 8 Drawing Sheets

| | | t (q−1) | v (t (q−1)) | d (t (q−1)) |
|---|---|---|---|---|
| | Q | t (q) | v (t (q)) | d (t (q)) |
| | | t (q+1) | v (t (q+1)) | d (t (q+1)) |
| | | t (q+2) | v (t (q+2)) | d (t (q+2)) |
| | | ⋮ | ⋮ | ⋮ |
| | | t (p−3) | v (t (p−3)) | d (t (p−3)) |
| | | t (p−2) | v (t (p−2)) | d (t (p−2)) |
| | | t (p−1) | v (t (p−1)) | d (t (p−1)) |
| | P | t (p) | v (t (p)) | d (t (p)) |
| | | | | |

LASER WELDING METHOD AND LASER WELDING APPARATUS

BACKGROUND OF THE INVENTION

1. Field of the Invention

The present invention relates to a laser welding method and a laser welding apparatus. More specifically, the present invention relates to a laser welding method and a laser welding apparatus capable of accurately projecting a laser beam on a previously detected weld position.

2. Description of the Related Art

Butt welding using a laser beam is used prevalently for welding members in order to manufacture automobiles, etc. Recently, $CO_2$ lasers have been replaced by YAG lasers capable of focusing a laser beam in a spot smaller than that formable by $CO_2$ lasers. A welding process using a YAG laser capable of focusing a laser beam in a small spot is able to achieve fine welding using a small laser-beam spot. Incidentally, fine welding requires forming the laser-beam spot at a groove in a positional accuracy of 0.1 mm or below.

However, the tracking accuracy of a conventional industrial robot is not so high with a result that the above-mentioned requirement cannot be satisfied. Therefore, a very expensive numerically controlled (NC) welding machine of which price is as high as several tens million Yens is used generally for butt welding using a YAG laser. The necessity of such an expensive NC welding machine is an impediment to the prevalent use of butt welding employing a YAG laser.

This impediment can be removed if a weld line can be tracked by a spot of a laser beam in a high tracking accuracy as mentioned above by an inexpensive industrial robot of which price is, for example, on the order of several million Yens. An industrial robot capable of operating in a high tracking accuracy is described in, for example, JP-A 246660/1994.

This industrial robot detects a weld position by a sensor prior to actually executing a welding operation, and stores data of the weld position obtained by the sensor in a memory. Then, the industrial robot reads the data from the memory when necessary, calculates a correction for correcting the position of the spot of the laser beam on the basis of the data, and executes a tracking control operation so that the laser beam is projected on a desired position.

However, it is difficult for this industrial robot to achieve a highly accurate tracking operation to project the laser beam accurately on a desired position because this industrial robot uses teaching data for calculating the correction for correcting the position on which the laser beam is to be projected.

SUMMARY OF THE INVENTION

The present invention has been made in view of such problems. It is therefore an object of the present invention to provide a laser welding method and a laser welding apparatus capable of accurately projecting a laser beam on a weld position without being affected by various errors such as intrinsic to an associated industrial robot.

According to the first aspect of the present invention, a laser welding method of moving a weld portion detector and a laser beam projector disposed behind the weld portion detector by a predetermined distance so that the weld portion detector and the laser beam projector do not move relatively to each other, and projecting a laser beam by the laser beam projector on a portion to be welded detected by the weld portion detector, comprising: sequentially storing pieces of data on weld positions detected by the weld portion detector in combination with times when the pieces of data on the weld positions are obtained and moving speeds at which the weld portion detector is moved in a memory; calculating a time when the weld portion detector passed a point at which the laser beam projector has just arrived on the basis of the times and the moving speeds stored in the memory; and projecting a laser beam by the laser beam projector on the weld position which was detected by the weld portion detector at the time calculated by the calculating step.

The time when the weld portion detector passed a position at which the laser beam projector has just arrived may be determined by calculating back in time a moving distance of the weld portion detector on the basis of the times and the moving speeds stored in the memory and determining the time as a time when the moving distance of the weld portion detector coincides with or exceeds the predetermined distance between the laser beam projector and the weld portion detector. Preferably, the data used for a calculation is erased upon a completion of the calculation of the time when the weld portion detector passed the position at which the laser beam projector has just arrived.

Preferably, the weld portion detector projects a plurality of flat laser beams toward the portion to be welded, images of the portion to be welded irradiated with the flat laser beams are formed by an imaging device, the images are added up to obtain a composite image, and the weld position is detected on the basis of the composite image.

Preferably, a pressing device whose relative position with respect to the laser beam projector is fixed applies pressure to the portion to be welded during a laser welding operation.

Preferably, the laser beam projector projects a YAG laser beam.

According to the second aspect of the present invention, a laser welding apparatus comprising: a weld portion detector of detecting a portion to be welded; a laser beam projector of projecting a laser beam on the portion to be welded; a holding-turning mechanism of holding the weld portion detector and the laser beam projector so as to maintain a predetermined distance between the weld portion detector and the laser beam projector and turning the laser beam projector in a direction perpendicular to a moving direction of the laser beam projector; a moving unit of moving the holding-turning mechanism; and a control unit of controlling a laser welding operation, the control unit sequentially storing pieces of data on weld positions detected by the weld portion detector together with times when the pieces of data on the weld positions are detected and moving speeds at which the holding-turning mechanism is moved in a memory, calculating a time when the weld portion detector passed a position at which the laser beam projector has just arrived, and controlling the laser beam projector and the holding-turning mechanism such that a laser beam is projected on a weld position which was detected by the weld portion detector at the time calculated by the controlling unit.

The time when the weld portion detector passed a position at which the laser beam projector has just arrived may be determined by calculating back in time a moving distance of the weld portion detector on the basis of the times and the moving speeds stored in the memory and determining the time as a time when the moving distance of the weld portion detector coincides with or exceeds the predetermined distance between the laser beam projector and the weld portion detector.

Preferably, the weld portion detector includes a flat laser beam projecting device and an imaging device, the control unit includes an image processing device, the flat laser beam projecting device projects a plurality of flat laser beams arranged at predetermined intervals, the imaging device forms images of parts irradiated with the flat laser beams, and the image processing device adds up the images formed by the imaging device to form a composite image, and a weld position is detected on the basis of the composite image.

Preferably, the laser welding apparatus further comprises a pressing device whose relative position with respect to the laser beam projector is fixed. The pressing device applies pressure to the portion to be welded during the laser welding operation.

Preferably, the laser beam projector comprises a YAG laser.

Preferably, the moving unit comprises a robot.

In the present invention having the above-mentioned features, even if the moving speed of the laser beam projector varies, since the weld position is detected by the weld portion detector disposed a predetermined distance in front of the laser beam projector, the laser beam projector is able to project a laser beam accurately on the weld position detected by the weld portion detector.

BRIEF DESCRIPTION OF THE DRAWINGS

The above and other objects, features and advantages of the present invention will become more apparent from the following description taken in connection with the accompanying drawings, in which:

FIG. 5 is a view of assistance in explaining an image processing procedure to be carried out by an image processing unit, in which FIG. 5(a) is a picture showing images of the part irradiated with flat laser beams and FIG. 5(b) is a picture showing an image obtained by adding up the images shown in FIG. 5(a);

DESCRIPTION OF THE PREFERRED EMBODIMENTS

Figure 1:
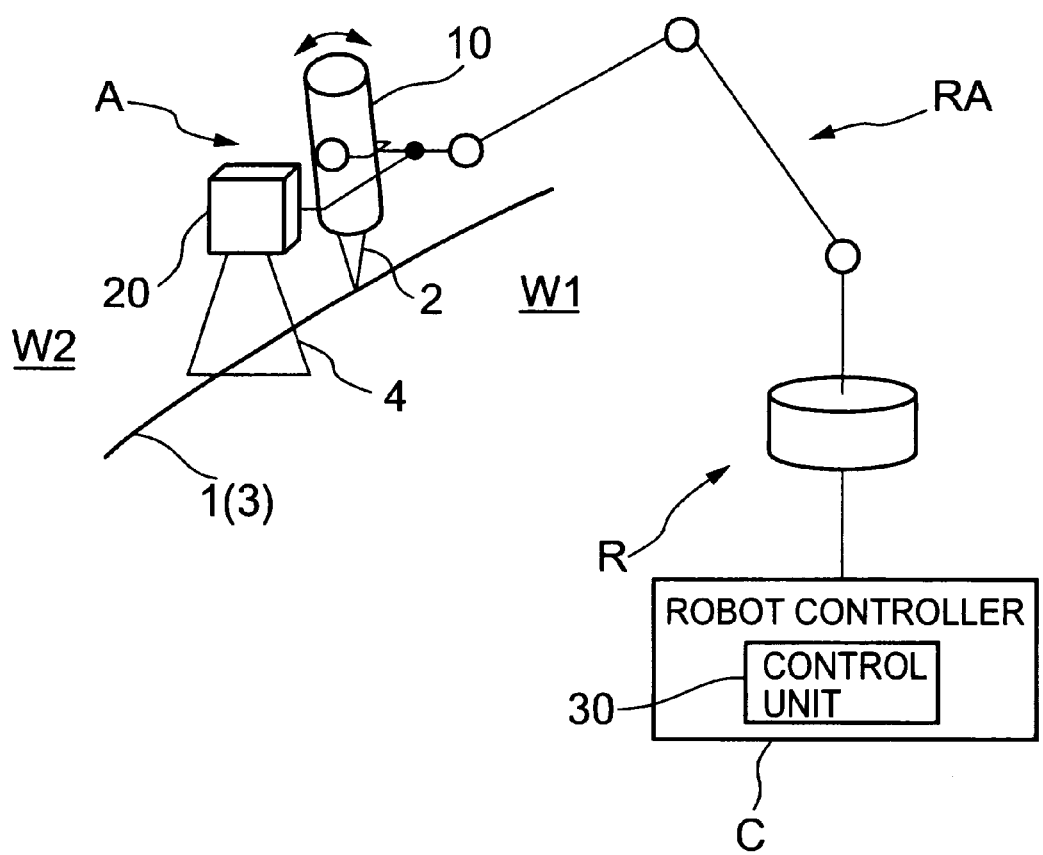
FIG. 1 is a diagrammatic view of a welding robot provided with a laser welding apparatus in a preferred embodiment according to the present invention.

A laser welding apparatus A in an embodiment according to the present invention for carrying out a laser welding method according to the present invention will be described with reference to FIGS. 1 to 9. Referring to FIG. 1, the laser welding apparatus A includes, as essential components, a laser beam projector 10 provided with a YAG laser, and a groove detector (weld portion detector) 20 disposed at a predetermined position in front of the laser beam projector 10 with respect to a welding direction in which the laser welding apparatus A is moved for welding. The laser welding apparatus A is attached to the extremity of a robot arm RA included in a welding robot R. A robot controller C controls the robot arm RA such that the laser welding apparatus A moves along a predetermined weld line 1. A control unit 30 included in the robot controller C controls the laser welding apparatus A such that a laser beam 2 is projected on the weld line 1 to weld together workpieces W1 and W2 by butt welding. The control unit 30 adjusts the position of the laser beam projector 10 so that the laser beam projector 10 projects a laser beam correctly on a groove 3 for laser butt welding.

Figure 2:
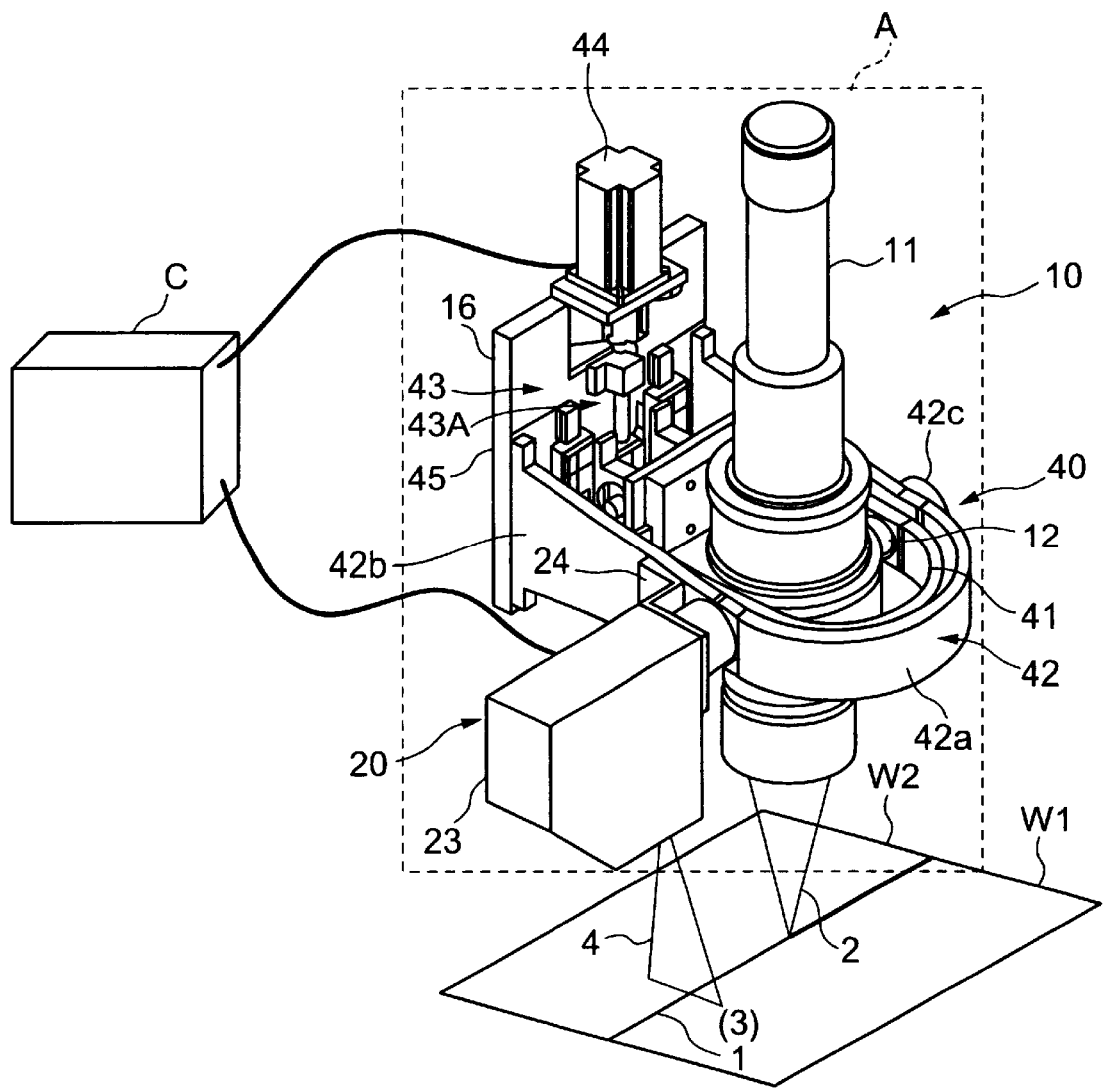
FIG. 2 is a perspective view of the laser welding apparatus shown in FIG. 1.

Referring to FIG. 2, the laser beam projector 10 includes an optical head 11 capable of projecting a YAG laser (laser spot beam) 2, and a holding-turning mechanism 40 attached to the extremity of the robot arm RA and capable of holding and turning the optical head 11.

The optical head 11 has a shape substantially resembling a stepped cylinder. A laser beam emitted by the YAG laser 2 is projected through a laser beam projecting end of the optical head 11 on a weld line. The optical head 11 is the same in configuration as an optical head included in a known laser beam projector provided with a YAG laser and hence the detailed description thereof will be omitted. A pair of shafts 12 are attached to parts of the cylindrical optical head 11 so as to extend in opposite directions, respectively, with their common axis passing the center of gravity of the optical head 11. The holding-turning mechanism 40 turns the optical head 11 on the shafts 12. In this embodiment, the optical head 11 is held by the holding-turning mechanism 40 with its laser beam projecting end facing down.

Referring to FIG. 2, the holding-turning mechanism 40 includes a turning frame 41 supporting the optical head 11, a holding frame 42 pivotally supporting the turning frame 41 supporting the optical head 11, a turning mechanism 43 including a motor 44 and a connector 43A, and a joining member 45 joined to the holding frame 43. A flange, not shown, formed integrally with the joining member 45 is fastened to a flange, not shown, attached to the extremity of the robot arm RA with bolts and nuts.

The turning frame 41 is formed by joining the free ends of opposite side parts of a U-shaped member to the opposite ends of a semicircular member. The optical head 11 is supported on the turning frame 41 with the shafts 12 fixedly extended through the opposite side parts of the U-shaped member.

The holding frame 42 is a U-shaped frame formed by joining plate-shaped side members 42b to the opposite ends of a semicircular member 42a. The radius of curvature of the semicircular member 42a is greater than that of the semicircular member of the turning frame 41. The turning frame 41 is surrounded by the holding frame 42. The respective semicircular members of the turning frame 41 and the holding frame 42 are on the same side with respect to the optical head 11. The shafts 12 are supported for turning in bearings 42c held on the plate-shaped members 42b of the holding frame 42.

The joining member 45 is, for example, a rectangular plate. The opposite ends of the U-shaped holding frame 42 are joined to the opposite sides of a lower part of a surface of the joining member 45, respectively. The motor 44 is fastened to an upper middle part of the front surface of the joining member 45. The flange to be joined to the flange attached to the extremity of the robot arm RA is formed on the back surface of the joining member 45.

Figure 3A:
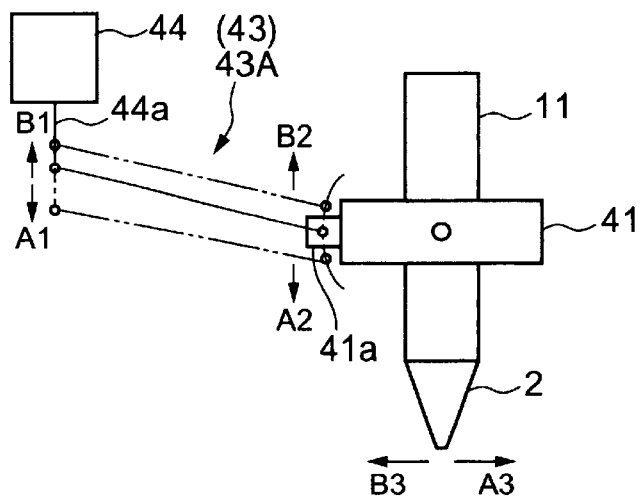
FIGS. 3A, 3B and 3C are schematic views of assistance in explaining an optical head turning mechanism.
Figure 3B:
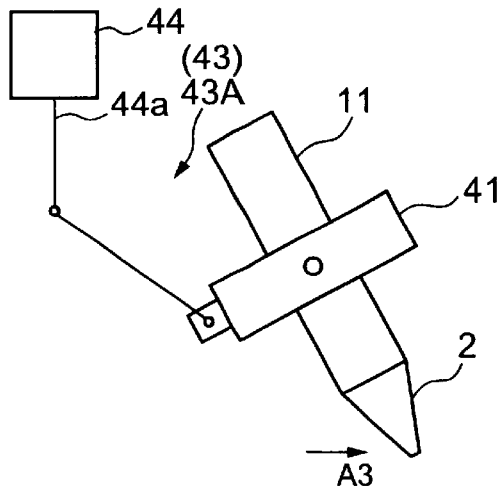
Figure 3C:
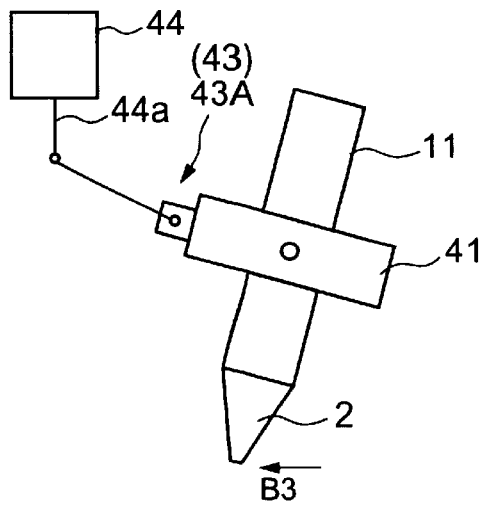

Referring to FIGS. 3A, 3B and 3C, the turning mechanism 43 has a link 43A having one end joined by a ball joint to an axially movable drive shaft 44a included in the motor 44, and the other end joined by a ball joint to a joint 41a attached to the outer surface of a cross part extending between the opposite side parts of the U-shaped member of the turning frame 41. When the motor 44 is driven to project the drive shaft 44a in the direction of the arrow A1 shown in FIG. 3A, the cross part of the U-shaped member is pushed down in the direction of the arrow A2 and the optical head 11 is turned counterclockwise in the direction of the arrow A3 as viewed in FIGS. 3A and 3B, so that the laser beam projecting end of the optical head 11 is moved outward, i.e., away from the robot arm RA, as indicated by the arrow A3. When the motor 44 is driven to retract the drive shaft 44a in the direction of the arrow B1 shown in FIG. 3A, the cross part of the U-shaped member is pulled up in the direction of the arrow B2 and the optical head 11 is turned clockwise in the direction of the arrow B3 as viewed in FIGS. 3A and 3C, so that the laser beam projecting end of the optical head 11 is moved inward, i.e., toward the robot arm RA, as indicated by the arrow B3. Since the shafts 12 of the optical head 11 are supported in the bearings 42c on the holding frame 42, the optical head 11 is thus turned on the shafts 12 in a direction perpendicular to a weld line.

Figure 4:
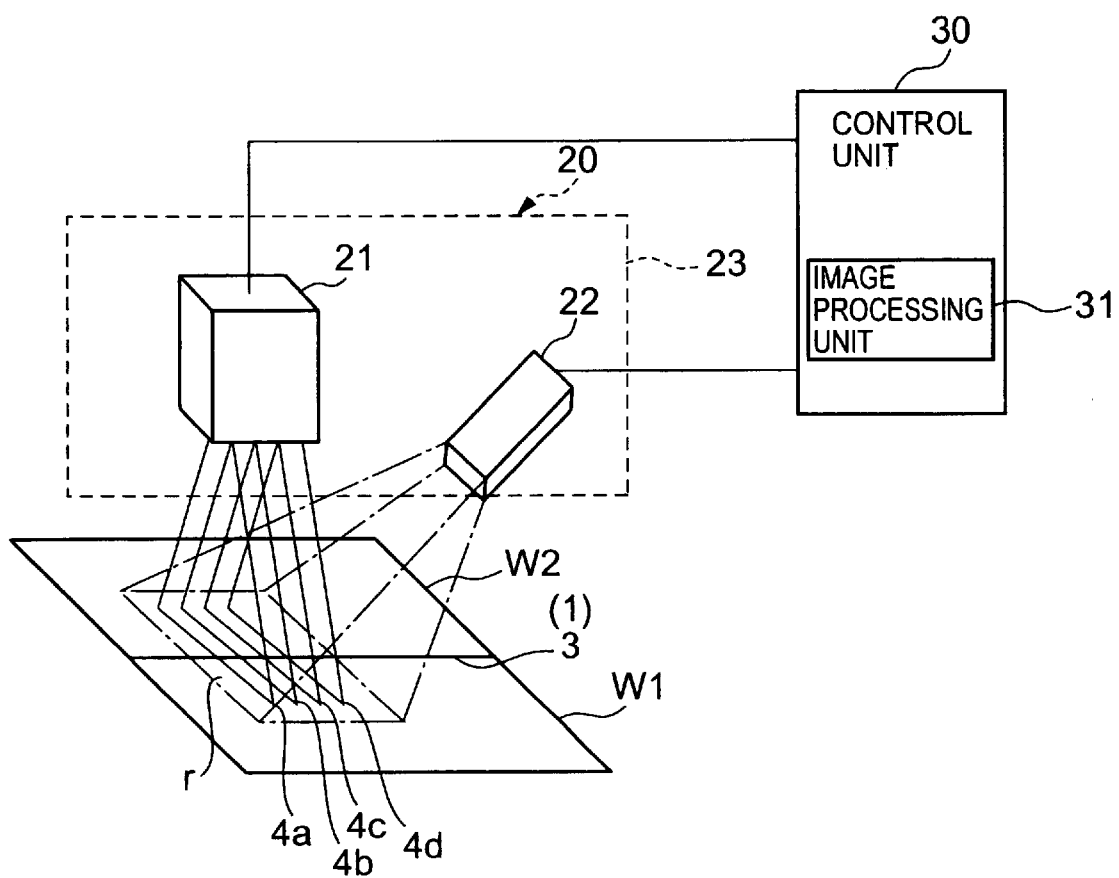
FIG. 4 is a diagrammatic view of a groove detector (weld portion detector)

Referring to FIGS. 1 and 4, the groove detector 20 includes a flat laser beam projecting device 21, an imaging device 22 for forming an image of a region r including a groove 3 illuminated by the flat laser beam projecting device 21 from a position obliquely behind the flat laser beam projecting device 21, and a case 23 holding the flat laser beam projecting device 21 and the imaging device 22 therein. The case 23 is held on a bracket 24 attached to the holding frame 42 so as to project flat laser beams 4 downward. The groove detector 20 is thus held on the holding frame 42 in front of the optical head 11 with respect to a welding direction in which the laser welding apparatus A is moved for welding.

The flat laser beam projecting device 21 projects a plurality of flat laser beams 4a, 4b, 4c and 4d arranged at predetermined intervals of, for example, 1 mm.

The imaging device 22 is, for example, a charge-coupled device (CCD) camera, i.e., a camera provided with a CCD. The imaging device 22 gives an electric signal representing the variation of the luminance of an objective surface to an image processing unit 31 included in the control unit 30.

The principle of detecting the groove 3 by the groove detector 20 will be described with reference to FIG. 5.

Figure 5:
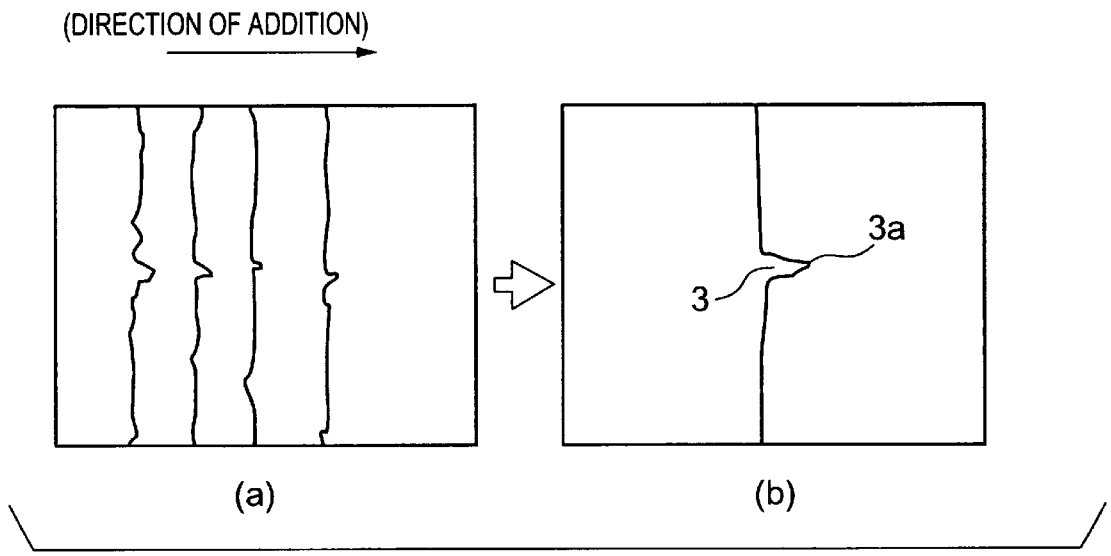

FIG. 5(a) shows an image of the region r formed by the imaging device 22, and FIG. 5(b) shows an image represented by an added image signal obtained by adding up image signals representing parts illuminated with the flat laser beams 4a, 4b, 4c and 4d shown in FIG. 4. As obvious from FIG. 5, the groove 3 cannot clearly be detected from the images of the parts illuminated with the flat laser beams 4a, 4b, 4c and 4d because those images include noise. In the image shown in FIG. 5(b), the noise levels out, the image of the groove 3 is emphasized and, hence the groove 3 can be clearly detected. A peak in the image signal representing the image shown in FIG. 5(b) corresponds to the center 3a of the groove 3.

Figure 6:
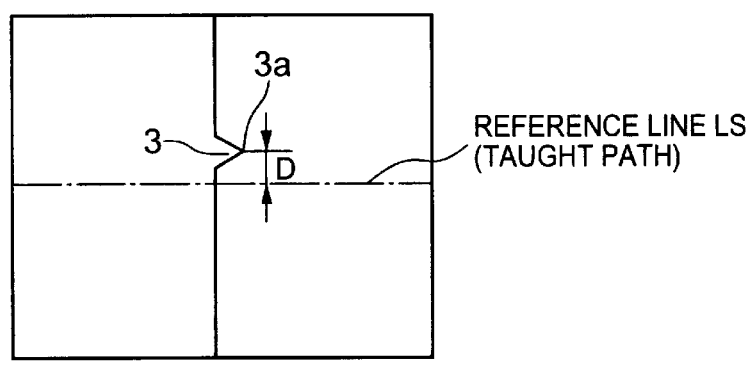
FIG. 6 is a view of assistance in explaining a principle of calculation of a positional error on the basis of images formed by an imaging device.

Therefore, as shown in e.g. FIG. 6, when a reference line LS in an image on the imaging device 22 is predetermined in the teaching path, an deviation D in the position of the center 3a of the groove 3 relative to the teaching line can be determined by calculating an deviation D in the position of the center 3a of the groove 3 relative to the reference line LS. As mentioned above, the groove detector 20 is spaced a predetermined distance ahead of the optical head 11. Accordingly, the laser beam 2 cannot be projected on the center 3a of the groove 3 even if the position of the optical head 11 relative to the groove 3 is corrected by a distance corresponding to the deviation D.

Therefore, the laser welding apparatus A executes the following procedure to make the optical head 11 disposed the predetermined distance behind the groove detector 20 project the laser beam 2 on the center 3a of the groove 3 detected by the groove detector 20.

Suppose that the laser welding apparatus A is moved at a fixed moving speed V along a weld line 1, and a position detected by the groove detector 20 and the spot of the laser beam 2 projected by the optical head 11 are spaced by a distance L. Then, the spot of the laser beam 20 arrives at the detected position in time L/V. Therefore, the spot of the laser beam 2 can be correctly formed on the center 3a of the groove 3 when the position of the optical head 11 is corrected the time L/V after the detection of the detected position by the groove detector 20. Thus, the weld line 1 can be tracked by the spot of the laser beam 2 by sequentially storing pieces of data on positions of the center 3a of the groove detected by the groove detector 20 in a memory, for example a buffer memory, included in the control unit 30, sequentially reading the pieces of data from the memory at times L/V after the detection of the positions of the center 3a of the groove 3, and correcting the position of the optical head 11 on the basis of the pieces of data read from the memory.

However, if the moving speed of the laser welding apparatus A varies, the laser beam 2 cannot be projected on the center 3a of the groove 3 even if the position of the optical head 11 is corrected by the aforesaid correcting method. If the moving speed of the laser welding apparatus A is variable, the time when the spot of the laser beam 2 projected by the optical head 11 is expected to pass the position on the center 3a of the groove previously detected by the groove detector 20 is determined by the following method. That is calculating a time when the groove detector 20 passed a position at which the spot of the laser beam 2 has just arrived.

Pieces of data on detection time t(n) at which the groove detector 20 detects a position on the groove 3, moving speed V(t(n)) of the laser welding apparatus A at the detection time, and deviation d(t(n)) in the position of the weld line 1 from the taught path (reference line LS) are stores sequentially at a fixed intervals of, for example 20 ms, in the buffer memory 33 included in the control unit 30.

Figures 7, 8:
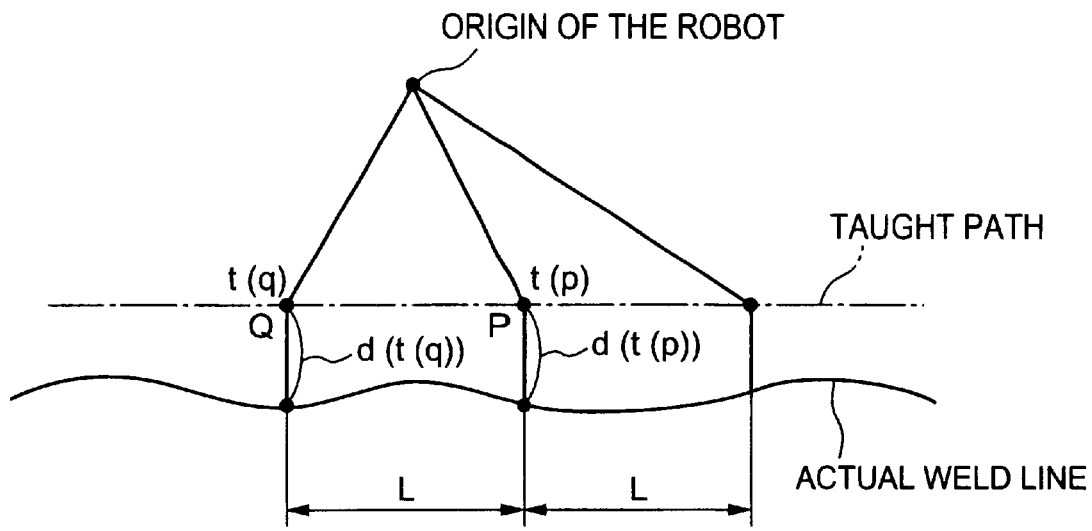
FIG. 7 is a diagrammatic view showing the positional relation between a detected position and a spot-forming position.
FIG. 8 is a diagram of the contents of a buffer memory.

A time when the groove detector 20 passed the position at which the optical head 11 has just arrived is calculated on the basis of the data stored in the buffer memory 33. For example, when the groove detector 20 arrived at a point P shown in FIG. 7, a time when the groove detector 20 passed a point Q a distance L behind the point P is calculated. Namely, a time when the optical head 11 will arrive at the point Q is calculated. Data stored in the buffer memory 33, i.e., pieces of data on time t(n) and moving speed V(t(n)) shown in FIG. 8, are used for calculating the time. Distances traveled before the time when groove detector 20 arrived at the point P are added up, and a time t(q) when the added distance reached or exceeded the distance L is determined.

The optical head 11 arrives at the point Q at the time t(q). Therefore, when an inequality:

$$L(t(q+1)) < L \leq L(t(q))$$

is satisfied, a time T when the groove detector 20 passed the point Q is expressed by:

$$T = t(q)$$

where $$L(t(q)) = V(t(p)) \times (t(p) - t(p-1)) + V(t(p-1)) \times (t(p-1) - t(p-2)) + \ldots$$
$$+ V(t(q+1)) \times (t(q+1) - t(q)) + V(t(q)) \times (t(q) - t(q-1))$$

$$L(t(q+1)) = V(t(p)) \times (t(p) - t(p-1)) + V(t(p-1)) \times (t(p-1) - t(p-2)) + \ldots$$
$$+ V(t(q+1)) \times (t(q+1) - t(q))$$

The positional deviation D of the welding line 1 from the reference line LS is, from the data stored in the buffer memory 33, expressed by:

$$D = d(t(q))$$

The control unit 30 controls the holding-turning mechanism 40 on the basis of the positional deviation D so that the laser beam 2 is projected on the center 3a of the groove 3. After the control unit 30 has completed the foregoing calculating operation, the data stored before the time t(q) in the buffer memory 33 is erased so that the buffer memory 33 may be a memory having no unnecessary storage capacity.

Figure 9:
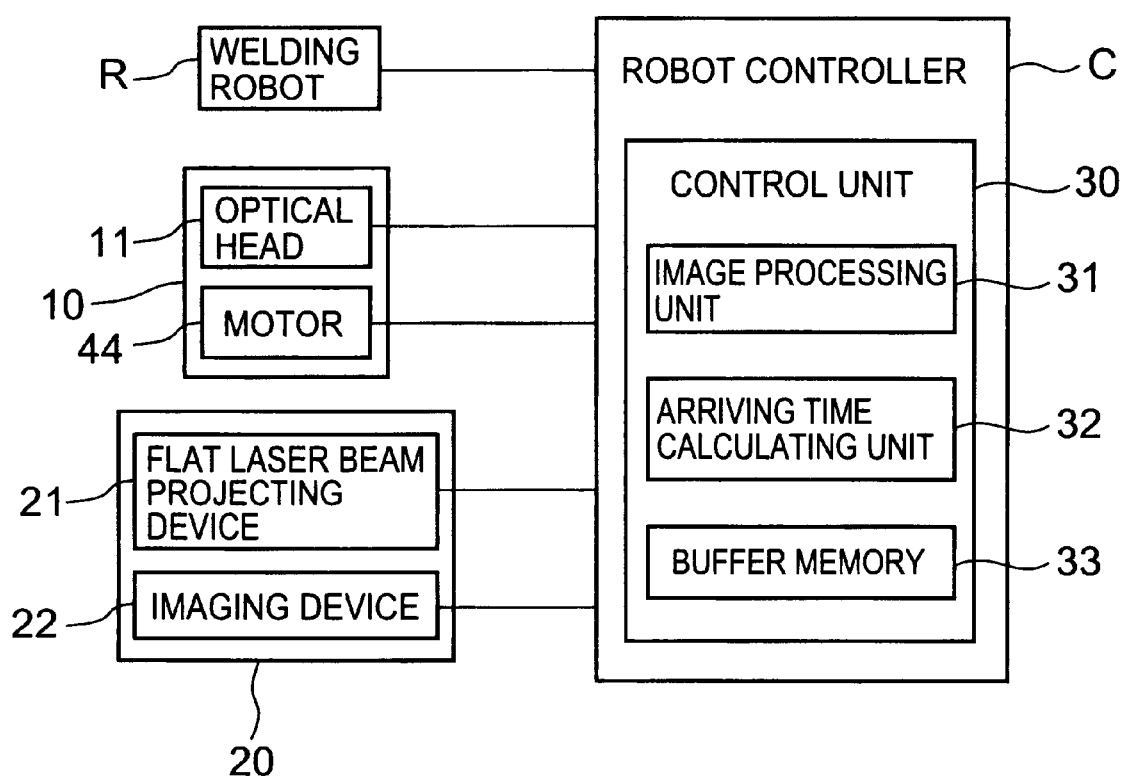
FIG. 9 is a block diagram of a controller.

FIG. 9 is a block diagram of the control unit 30 having the aforesaid image processing function, and the time calculating function to calculate the time when the optical head 11 is expected to arrive at the position detected by the groove detector 20. The control unit 30 includes the image processing unit 31, an arriving time calculating unit 32 and the buffer memory 33. Actually, the control unit 30 including the units 31 and 32 is realized by storing programs defining the functions of the units 31 and 32 in the robot controller C.

Even if the moving speed of the laser welding apparatus A in the present embodiment is variable, the spot of the laser beam 2 can be accurately formed on the center 3a of the groove 3 detected by the groove detector 20 disposed in front of the optical head 11 with respect to the welding direction, so that accurate welding can be achieved. Since the joining member 45 holding both the optical head 11 and the groove detector 20 is attached to the robot hand RA, errors intrinsic to the welding robot R can be prevented from affecting the welding accuracy. That is, since the distance by which the optical head 11 moved is a relative value calculated on the basis of data on the position of the optical head 11 before movement and that of the same after movement, the distance is not affected by the errors intrinsic to the welding robot R. Since the position of the groove 3 is detected by adding the plurality of images of the parts illuminated with the plurality of flat laser beams, the variation of the groove 3 is magnified, the influence of noise can be eliminated and the center 3a of the groove 3 can be accurately detected.

Incidentally, slight steps and gaps can be detected by the aforesaid groove detecting method.

Figure 10:
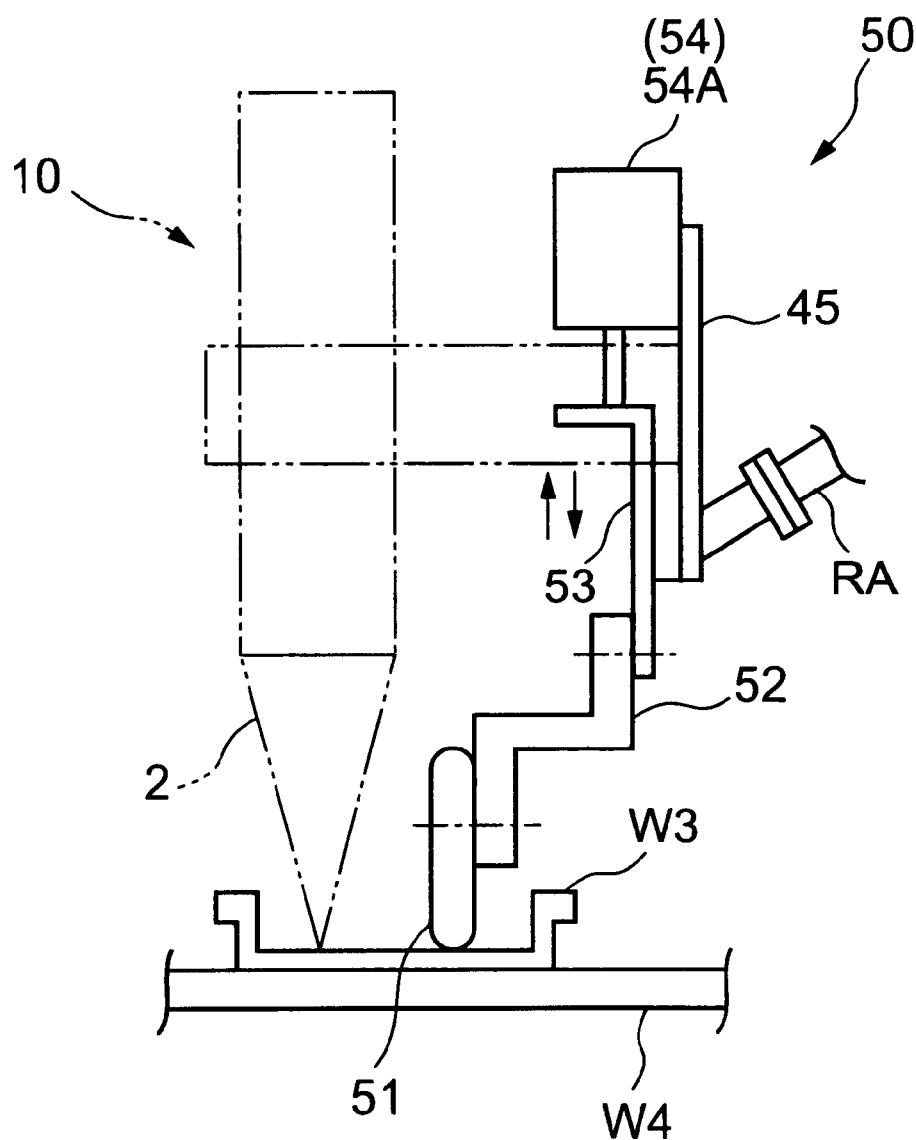
FIG. 10 is a schematic front elevation of an essential part of a laser welding apparatus in another embodiment according to the present invention.

A laser welding apparatus in another embodiment according to the present invention for carrying out a laser welding method will be described with reference to FIG. 10. The laser welding apparatus A1 is a modification of the laser welding apparatus A in the previous embodiment. Referring to FIG. 10, the laser welding apparatus A1 includes, in addition to components similar to those of the laser welding apparatus A in the previous embodiment, a pressing unit 50. The pressing unit 50 presses a workpiece W3 superposed on a workpiece W4 with a pressure wheel 51 during lap-welding using a laser beam (spot light) 2 emitted by the YAG laser included in the optical head of the laser beam projector 10.

The pressing unit 50 includes the pressure wheel 51 which applies pressure to a part of the workpiece W3 around a weld line, a support member 52 supporting the pressure wheel 51 for rotation, a sliding member 53, and a cylinder actuator 54, such as a pneumatic cylinder actuator 54A. An upper part of the support member 52 is fastened to a lower part of the sliding member 53. The cylinder actuator 54 drives the sliding member 53 for sliding along a guide fastened to the joining member 45 to apply pressure to the workpiece W3 by the pressure wheel 51. The sliding member 53 and the cylinder actuator 54 is held on the surface of the joining member 45 on which the laser beam projector 10 is mounted. Thus, the laser beam projector 10 and the pressing unit 50 are united to maintain the same positional relation, that is, the laser beam projector 10 and the pressing unit 50 move vertically as an integral unit. The cylinder actuator 54 is controlled such that the pressure wheel 51 applies a fixed pressure to the workpiece W3.

According to the present embodiment, since the workpiece W3 is pressed against the workpiece W4 by a fixed pressure during welding, a satisfactory weld quality can be achieved. Since the laser beam projector 10 and the pressing unit 50 maintain the same positional relation, the distance between the optical head 11 and the surface of the workpiece W3 does not change even if the pressure wheel 51 rolls along the surface of the workpiece W3. Thus, the focal point of the optical head 11 can be always on the surface of the workpiece W3 even if the pressure wheel 51 rolls along the surface of the workpiece W3. Namely, a laser beam emitted by the YAG laser and projected by the laser beam projector 10 can be always focused on the surface of the workpiece W3.

Various modifications of the foregoing preferred embodiments are possible. For example, although the groove detector of the laser welding apparatus in the foregoing embodiments uses the four flat laser beams, the number of the flat laser beams that are projected by the groove detector may be any suitable number other than four, e.g., two or five.

Although the laser welding apparatus in the foregoing embodiments have been described as applied to welding operations in which the weld line is straight, the laser welding apparatus of the present invention are applicable to welding along a curved weld line, provided that the curved weld line has a large radius of curvature and a segment of the curved weld line between the laser beam projector and the groove detector can be regarded as a straight segment.

Although the control unit 30 of the foregoing embodiments is included in the robot controller C, the control unit 30 may be incorporated into the laser beam projector 10 and may be capable of exchange signals with the robot controller C.

As apparent from the foregoing description, according to the present invention, the laser beam projector is able to project a laser beam accurately on a part of a workpiece detected by the groove detector held at a predetermined distance in front of the laser beam projector with respect to the welding direction even if the moving speed of the laser welding apparatus is variable.

The laser welding apparatus of the present invention is able to surely and accurately detect a groove, i.e., a weld line, even if the shape of the groove has so small variation that the detection of the groove is difficult.

The laser welding apparatus of the present invention uses a memory effectively.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A laser welding apparatus comprising:

a weld portion detector of detecting a portion to be welded;

a laser beam projector of projecting a laser beam on the portion to be welded;

a holding-turning mechanism of holding the weld portion detector and the laser beam projector so as to maintain a predetermined distance between the weld portion detector and the laser beam projector and turning the laser beam projector, independently of the weld portion detector, in a direction perpendicular to a moving direction of the laser beam projector;

a moving unit of moving the holding-turning mechanism; and a control unit of controlling a laser welding operation, the control unit sequentially storing pieces of data on weld positions detected by the weld portion detector together with times when the pieces of data on the weld positions are detected and moving speeds at which the holding-turning mechanism is moved in a memory, calculating a time when the weld portion detector passed a position at which the laser beam projector has just arrived, and controlling the laser beam projector and the holding-turning mechanism such that a laser beam is projected on a weld position which was detected by the weld portion detector at the time calculated by the controlling unit.

2. The laser welding apparatus according to claim 1, wherein the time when the weld portion detector passed a position at which the laser beam projector has just arrived is determined by calculating back in time a moving distance of the weld portion detector on the basis of the times and the moving speeds stored in the memory and determining the time as a time when the moving distance of the weld portion detector coincides with or exceeds the predetermined distance between the laser beam projector and the weld portion detector.

3. The laser welding apparatus according to claim 1, wherein the weld portion detector includes a flat laser beam projecting device and an imaging device, the control unit includes an image processing device, wherein the flat laser beam projecting device projects a plurality of flat laser beams arranged at predetermined intervals, wherein the imaging device forms images of parts irradiated with the flat laser beams, and wherein the image processing device adds up the images formed by the imaging device to form a composite image, and a weld position is detected on the basis of the composite image.

4. The laser welding apparatus according to claim 2, wherein the weld portion detector includes a flat laser beam projecting device and an imaging device, the control unit includes an image processing device, wherein the flat laser beam projecting device projects a plurality of flat laser beams arranged at predetermined intervals, wherein the imaging device forms images of parts irradiated with the flat laser beams, and wherein the image processing device adds up the images formed by the imaging device to form a composite image, and a weld position is detected on the basis of the composite image.

5. The laser welding apparatus according to claim 1 further comprising a pressing device whose relative position with respect to the laser beam projector is fixed, the pressing device adapted to press the portion to be welded during the laser welding operation.

6. The laser welding apparatus according to claim 2 further comprising a pressing device whose relative position with respect to the laser beam projector is fixed, the pressing device adapted to press the portion to be welded during the laser welding operation.

7. The laser welding apparatus according to claim 3 further comprising a pressing device whose relative position with respect to the laser beam projector is fixed, the pressing device adapted to press the portion to be welded during the laser welding operation.

8. The laser welding apparatus according to claim 4 further comprising a pressing device whose relative position with respect to the laser beam projector is fixed, the pressing device adapted to press the portion to be welded during the laser welding operation.

9. The laser welding apparatus according to claim 1, wherein the laser beam projector comprises a YAG laser.

10. The laser welding apparatus according to claim 1, wherein the moving unit comprises a robot.

* * * * *